United States Patent
Wu et al.

(10) Patent No.: US 8,498,245 B2
(45) Date of Patent: Jul. 30, 2013

(54) METHOD OF ARRANGING PACKETS IN A WIRELESS COMMUNICATION SYSTEM AND RELATED DEVICE

(75) Inventors: Cheng-Hsuan Wu, Taipei (TW); Yen-Chin Liao, Taipei (TW); Yung-Szu Tu, Taipei County (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 251 days.

(21) Appl. No.: 12/979,382

(22) Filed: Dec. 28, 2010

(65) Prior Publication Data

US 2011/0280232 A1   Nov. 17, 2011

Related U.S. Application Data

(60) Provisional application No. 61/345,087, filed on May 15, 2010.

(51) Int. Cl.
*H04W 40/00* (2009.01)

(52) U.S. Cl.
USPC .......................................... 370/328

(58) Field of Classification Search
USPC ................. 370/310, 341, 470, 328–330, 335, 370/338
See application file for complete search history.

(56) References Cited

U.S. PATENT DOCUMENTS

| | | | | |
|---|---|---|---|---|
| 2007/0153830 A1* | 7/2007 | Xhafa et al. | | 370/470 |
| 2011/0032875 A1* | 2/2011 | Erceg et al. | | 370/328 |
| 2011/0194655 A1* | 8/2011 | Sampath et al. | | 375/341 |
| 2012/0020261 A1* | 1/2012 | Van Zelst et al. | | 370/310 |
| 2012/0213181 A1* | 8/2012 | Walton et al. | | 370/329 |

OTHER PUBLICATIONS

Yong Liu, et al., "VHT frame padding", Jan. 19, 2010.
Jaewoo Park, et al., "802.11ac MAC frame length indication", Mar. 16, 2010.

* cited by examiner

*Primary Examiner* — Kwang B Yao
*Assistant Examiner* — Syed M Bokhari
(74) *Attorney, Agent, or Firm* — Winston Hsu; Scott Margo

(57) ABSTRACT

A method of arranging a packet in a wireless communication system includes a preamble sequence and a data sequence. The preamble sequence includes a legacy training field (L-TF), a legacy signal field (L-SIG), a very high throughput signal field (VHT-SIG), a very high throughput short training field (VHT-STF) and at least one very high throughput long training field (VHT-LTF). The method includes generating a first VHT-SIG field and a second VHT-SIG field according to the VHT-SIG field; and arranging the L-TF field, the L-SIG field, the first VHT-SIG field, the VHT-STF field, one of the at least one VHT-LTF fields, the second VHT-SIG field and the rest of the at least one VHT-LTF fields in a predetermined sequence.

12 Claims, 7 Drawing Sheets

METHOD OF ARRANGING PACKETS IN A WIRELESS COMMUNICATION SYSTEM AND RELATED DEVICE

CROSS REFERENCE TO RELATED APPLICATIONS

This application claims the benefit of U.S. Provisional Application No. 61/345,087, filed on May 15, 2010 and entitled "METHOD FOR MULTI USER FRAME PADDING AND TRANSCEIVER USING THE SAME", the contents of which are incorporated herein.

BACKGROUND OF THE INVENTION

1. Field of the Invention

The present invention relates to a method of arranging packets in a wireless communication system, and more particularly, to a method of arranging packets complying with the IEEE 802.11ac standard.

2. Description of the Prior Art

Wireless local area network (WLAN) technology is one of the popular wireless communication technologies in the world. In the beginning, WLAN technology is developed for military use, while in recent years, WLAN technology is widely implemented in consumer electronics, e.g. desktop computers, laptop computers, personal digital assistants, etc., to facilitate convenient and high-speed wireless communication. IEEE 802.11 standard is a set of WLAN protocols established by the Institute of Electrical and Electronics Engineers (IEEE).

In details, IEEE 802.11 is composed of more than 20 different standards distinguished from each other by a letter appended to the end of IEEE 802.11. The familiar IEEE 802.11 series are IEEE 802.11a, 802.11b, 802.11g, 802.11n standard and so on. The most difference among each of the IEEE 802.11 series is modulation method and maximum data rate. For example, for modulating signals, IEEE 802.11a/g/n standard utilize orthogonal frequency division multiplexing (OFDM) method, whereas IEEE 802.11b/g utilize direct-sequence spread spectrum (DSSS) method. IEEE 802.11n standard is different from IEEE 802.11a/g standard in adding a multiple-input multiple-output (MIMO) technique and other features that greatly enhance data rate and throughput.

Please refer to FIG. 1, which is a diagram of an IEEE 802.11n packet structure according to the prior art. An IEEE 802.11n packet consists of a preamble portion in the front of a packet and a data portion after the preamble portion. The IEEE 802.11n preamble is of mixed format, backward compatible with IEEE 802.11a/g standard devices, and includes legacy Short Training field (L-STF), legacy Long Training field (L-LTF), legacy Signal field (L-SIG), high-throughput Signal field (HT-SIG), high-throughput Short Training field (HT-STF), and high-throughput Long Training fields (HT-LTF). L-STF is used for start-of-packet detection, automatic gain control (AGC), initial frequency offset estimation, and initial time synchronization. L-LTF is used for further fine frequency offset estimation and time synchronization. L-SIG carries data rate (which modulation and coding scheme is used) and length (amount of data) information. HT-SIG also carries data rate and length information, and is used for packet detection so that the mixed format or the legacy format the transmitted packet uses can be detected. HT-STF is used for automatic gain control. HT-LTF is used for MIMO channel detection. The data portion further includes service field, physical layer convergence procedure (PLCP) service data unit (PSDU) field, tail field and pad field. The service field is used for synchronizing a descrambler to enable estimation of an initial state of a scrambler in the receiver. The PSDU field is used for carrying user data. The tail field is appended after the PSDU field, and the pad field is used for carrying redundant data to fulfill a maximum length of the IEEE 802.11n packet.

For the achievement of a higher quality WLAN transmission, the IEEE committee creates a new generation IEEE 802.11ac standard, which is IEEE 802.11 VHT (Very High Throughput) standard. IEEE 802.11ac uses the OFDM method and MIMO technique the same as IEEE 802.11n as well. Currently, the frame architecture and padding scheme for an IEEE 802.11ac packet structure is not decided yet. Two purposes for defining the frame architecture and padding scheme are as follows.

IEEE 802.11-10/0064r2 discloses a VHT frame padding structure. Please refer to FIG. 2, which is a schematic diagram of an IEEE 802.11ac packet structure according to the prior art. A VHT-SIG field indicates a maximum duration behind the VHT-SIG field for all users, but does not indicate a length information of a media access control (MAC) protocol data unit (PDU), MPDU, for each user. In such a situation, an end-of-file (EOF) flag in the null subframe is appended in the end of the MPDU instead, such that the decoder keeps operating until detecting the EOF flag, which wastes more power in comparison with a decoder with the length information of MPDU in advance. Moreover, a pad field and a tail field are appended sequentially after the EOF flag. The tail field is appended in the end of the packet. The pad field is divided into a MAC pad and a physical (PHY) pad, to be appended between MPDU and the tail field. The PHY pad is less than 8 bits and is appended after the MAC pad. However, the padding mechanism causes the complexity of circuit processing, and is not compatible with IEEE 802.11n standard.

IEEE 802.11-10/0358r0 discloses a VHT frame length indication structure. Please refer to FIG. 3, which is a schematic diagram of an IEEE 802.11ac packet structure according to the prior art. The IEEE 802.11ac packet structure includes two VHT-SIG fields. One VHT-SIG field indicates the common information for all users, such as a maximum duration for all users, while the other VHT-SIG field indicates individual information related to each user, such as a length of a physical layer convergence procedure (PLCP) service data unit (PSDU) field. However, the IEEE 802.11ac packet structure only defines VHT-SIG field clearly, and does not determine how to define the rest fields. Therefore, no padding process is indicated after the PSDU field, which causes a problem for a decoder to process the rest data after the PSDU field.

SUMMARY OF THE INVENTION

It is therefore a primary objective of the claimed invention to provide a method of arranging a packet in a wireless communication system, to solve abovementioned problem.

The present invention discloses a method of arranging a packet in a wireless communication system. The packet comprises a preamble sequence and a data sequence, and the preamble sequence comprises a legacy training field (L-TF), a legacy signal field (L-SIG), a very high throughput signal field (VHT-SIG), a very high throughput short training field (VHT-STF) and at least one very high throughput long training field (VHT-LTF). The method comprises generating a first VHT-SIG field and a second VHT-SIG field according to the VHT-SIG field; and arranging the L-TF field, the L-SIG field, the first VHT-SIG field, the VHT-STF field, one of the at least one VHT-LTF fields, the second VHT-SIG field and the rest of the at least one VHT-LTF fields in a predetermined sequence.

The present invention further discloses a method of arranging a packet in a wireless communication system. The packet comprises a preamble sequence and a data sequence, and the preamble sequence comprises a legacy training field (L-TF), a legacy signal field (L-SIG), a very high throughput signal field (VHT-SIG), a very high throughput short training field (VHT-STF) and at least one very high throughput long training field (VHT-LTF). The method comprises generating a first VHT-SIG field and a second VHT-SIG field according to the VHT-SIG field; arranging the L-TF field, the L-SIG field, the first VHT-SIG field, the VHT-STF field, the at least one VHT-LTF field and the second VHT-SIG field in a predetermined sequence.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
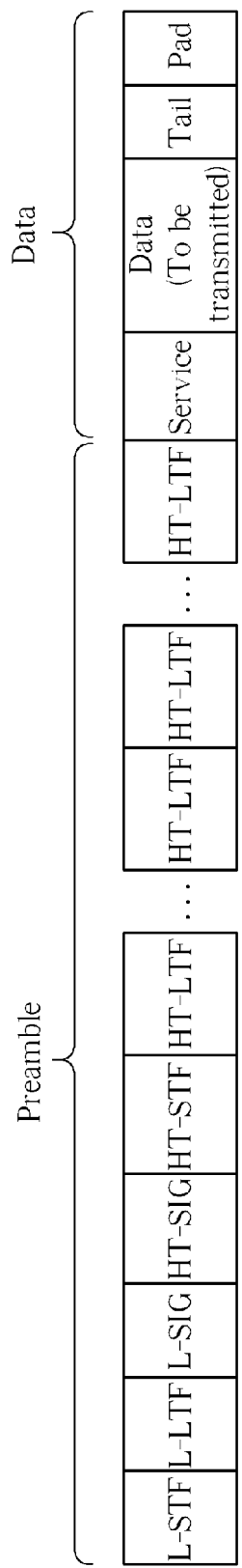
FIG. 1 is a schematic diagram of an IEEE 802.11n packet structure according to the prior art.
Figure 2:
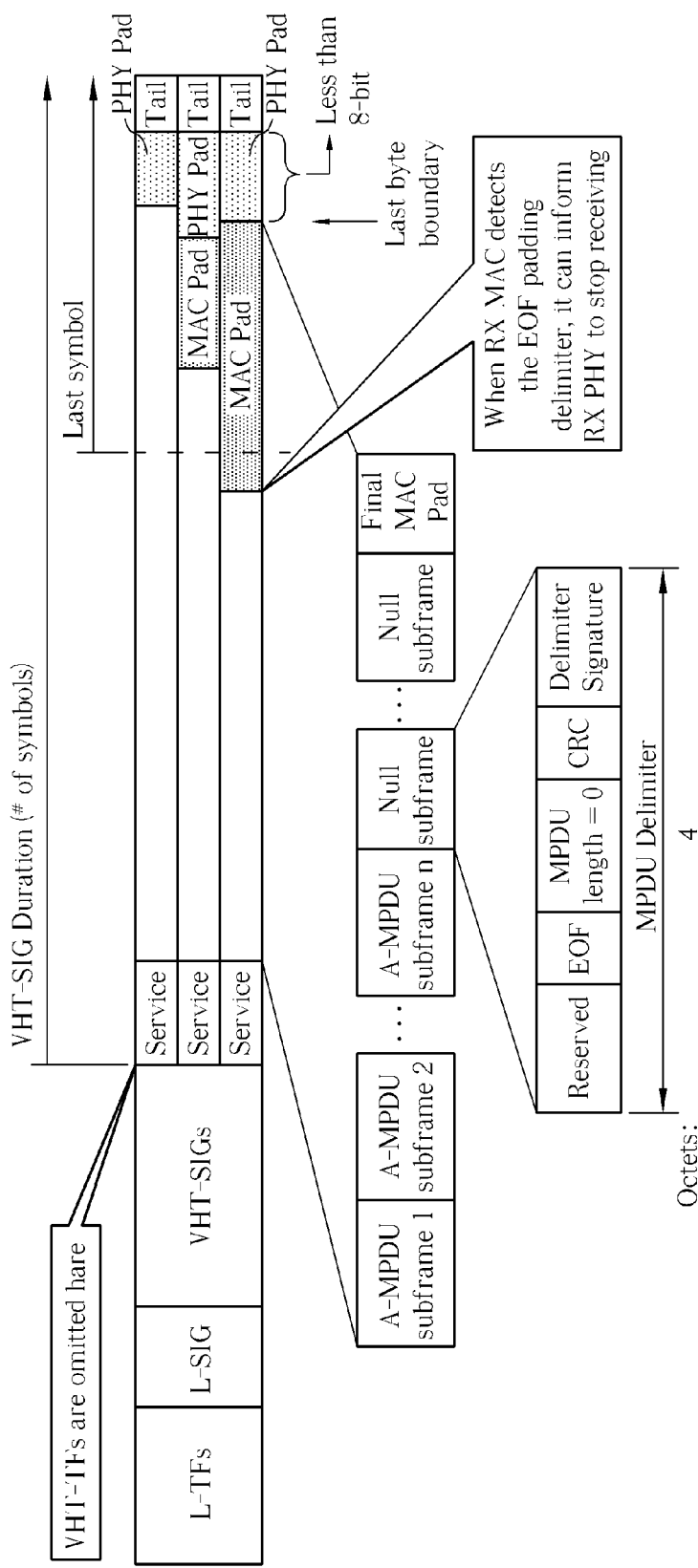
FIG. 2 is a schematic diagram of an IEEE 802.11ac packet structure according to the prior art.
Figure 3:
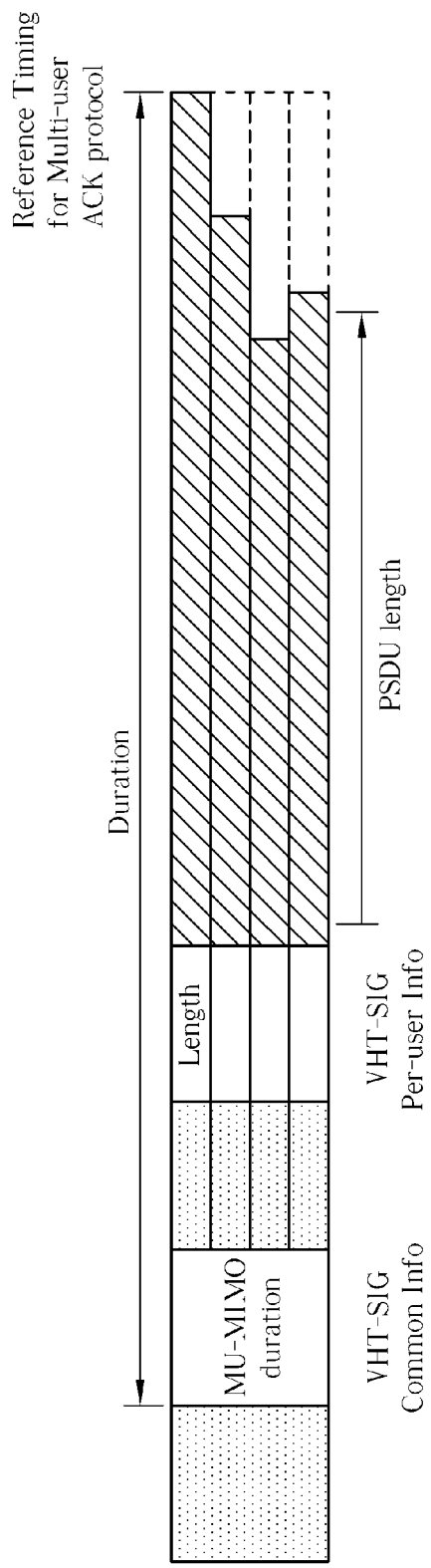
FIG. 3 is a schematic diagram of an IEEE 802.11ac packet structure according to the prior art.
Figure 4:
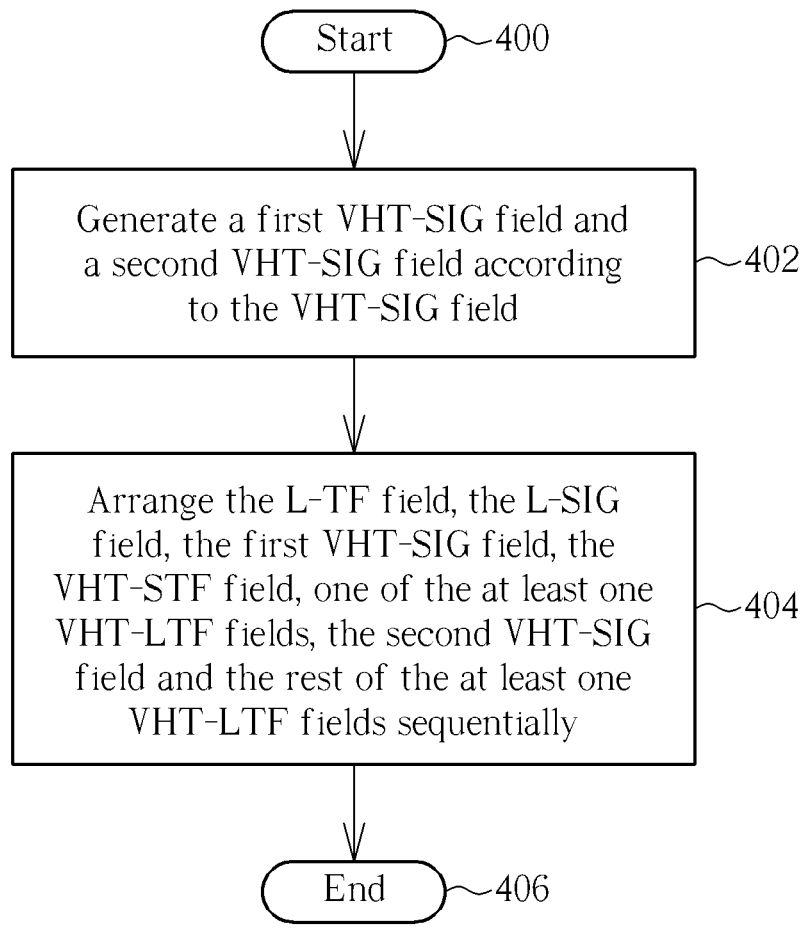
FIG. 4 is a schematic diagram of a process according to an embodiment of the present invention.

Please refer to FIG. 4. FIG. 4 is a flowchart of a process 40 according to an embodiment of the present invention. The process 40 is utilized for arranging packets in a wireless communication system conforming to a very high throughput (VHT) standard, e.g. IEEE 802.11ac standard. In the wireless communication system, each packet includes a preamble portion and a data portion. The preamble portion includes a legacy training field (L-TF), a legacy signal field (L-SIG), a very high throughput signal field (VHT-SIG), a very high throughput short training field (VHT-STF) and at least one very high throughput long training field (VHT-LTF). The process 40 is utilized for arranging a sequence of the preamble portion and includes steps of:

Step 400: Start.

Step 402: Generate a first VHT-SIG field and a second VHT-SIG field according to the VHT-SIG field.

Step 404: Arrange the L-TF field, the L-SIG field, the first VHT-SIG field, the VHT-STF field, one of the at least one VHT-LTF fields, the second VHT-SIG field and the rest of the at least one VHT-LTF fields sequentially.

Step 406: End.

According to the process 40, two VHT-SIG fields, hereinafter named VHT-SIG A and B fields for simplicity, are generated according to the VHT-SIG field, e.g. by dividing the VHT-SIG field into the VHT-SIG A and B fields. And, the preamble portion is composed of the L-TF field, the L-SIG field, the VHT-SIG A field, the VHT-STF field, one VHT-LTF field, the VHT-SIG B field and the rest VHT-LTF fields in a predetermined sequence, such as sequentially. More specifically, please further refer to FIG. 5, which is a schematic diagram of a packet structure 50 according to the process 40. The packet structure 50 is an exemplary embodiment for narrating the preamble portion arranged according to the process 40.

In the packet structure 50, the VHT-SIG A field and the VHT-SIG B field are utilized to carry different information, and thereby a decoder can process the rest preamble portion and following data portion more efficiency. In addition, the data portion includes a service field, a PSDU field, a tail field and a pad field, which are arranged sequentially, to be compatible with IEEE 802.11n standard, so as to keep the IEEE 802.11n parsing mechanism. Note that, the PSDU field contains MAC layer protocol data unit (MPDU) or aggregated MPDUs, and is transmitted by space division multiple access (SDMA) technology. In addition, the name PSDU may become MAC service data unit (MSDU), MPDU or PLCP protocol data unit (PPDU), etc. according to message exchange between different protocol layers.

Moreover, in IEEE 802.11ac standard, the VHT-STF field is used for start-of-packet detection, automatic gain control (AGC) setting, initial frequency offset estimation, and initial time synchronization. The VHT-LTF field is used for fine frequency offset estimation, time synchronization, and estimating the multi-input multi-output (MIMO) channel characteristics. Therefore, via the process 40, since the VHT-STF field and the VHT-LTF field are arranged before the VHT-SIG B field and used for estimating frequency offset and time synchronization, the carried information of the VHT-SIG B field can be decoded more precisely, so as to assist decoding process of the data portion. Note that, the embodiment of the present invention uses one VHT-LTF field to facilitate decoding of follow-up fields, and those skilled in the art can make alternations or modifications accordingly. For example, two or more VHT-LTF fields can be inserted between the VHT-STF field and the VHT-SIG B field according to system requirements. In addition, a number of the VHT-LTF fields is varied with the channel characteristic and is determined by a base station. For example, if a channel is a fast fading channel and suffers much noise, the base station can increase the number of the VHT-LTF field after obtaining the channel characteristic information, so as to provide enough channel information for decoding the successive data successfully. Oppositely, if a channel suffers less noise and is a slow fading channel, the base station can decrease the number of the VHT-LTF field, such that the bandwidth can be saved, so as to transmit more user data. Note that, the number of the VHT-LTF field may only be one due to system design considerations. In such a situation, the sequence of the preamble portion becomes the L-TF field, the L-SIG field, the VHT-SIG A field, the VHT-STF field, the VHT-LTF field and the VHT-SIG B field in a predetermined sequence, such as sequentially, and the sequence of the data portion remains the same as mentioned above, to be compatible with IEEE 802.11n standard. Therefore, the channel characteristic is estimated according to the VHT-LTF field put before the second VHT-SIG field, and thereby the data portion is decoded accordingly.

Furthermore, since different VHT-SIG fields are utilized to carry different information to assist a decoding process of rest preamble portion and following data portion, the decoder can progress successive data more efficiently. For example, in the process 40, the VHT-SIG A field can include common information used by all MIMO users, such as a maximum duration, whereas the VHT-SIG A field can include individual information used by each user, such as a number of the VHT-LTF fields or a length of the PSDU field. Therefore, the decoder can utilize the indicated number of the VHT-LTF fields from the VHT-SIG B field for estimating the channel condition and obtaining the appropriate end point of VHT-LTF fields, such that the decoder can start decoding the PSDU field, so as to increase the efficiency for processing rest preamble portion and following data portion. Similarly, when receiving the length information of the PSDU field from the VHT-SIG B field, the decoder can stop immediately after finishing decoding the PSDU field, so as to save power consumption. In addition, according to information bits carried in the VHT-SIG A field, the VHT-SIG A field may include one or two orthogonal frequency division multiplexing (OFDM) symbols, and may not include a cyclic redundancy check code (CRC) check and tail bits used for decoding. The VHT-SIG B field may include two OFDM symbols, to carry the length information, the CRC check, or tail bits for decoding, etc.

Note that, the process 40 is an embodiment of the present invention, and those skilled in the art can make different alterations or modifications accordingly. For example, the IEEE 802.11ac packet can include three VHT-SIG fields, which are a VHT-SIG I field, a VHT-SIG II field and a VHT-SIG III field. The VHT-SIG I field includes common information of all MIMO users, the VHT-SIG II field includes individual PSDU field length of each user, and the VHT-SIG III field carries different information, such as a support data rate, an estimated download time, or a name of network operator, etc. The spirit of the present invention is to utilize different VHT-SIG fields to carry different information, and then make sure each VHT-SIG field can be decoded correctly, so as to increase efficiency for the decoder to process rest preamble portion and following data portion. Operations of determining a number of the VHT-SIG fields and correctly decoding each VHT-SIG field, are ordinary skills in the art. Thus, those skilled in the art can make different alterations or modifications according to system requirements. For example, one, or two VHT-LTF fields can be added before the VHT-SIG field according to the channel characteristic or a bit length of the VHT-SIG field, such that the VHT-SIG field can be decoded correctly, so as to process whole packet more efficiency.

In addition, the pad field in the data portion is used to match the maximum duration and synchronize data of each user, and is not limited to any pad type. For example, the pad field can be filled with a media access control (MAC) pad, a physical (PHY) pad, or a combination of the MAC pad and the PHY pad, etc. However, in comparison with IEEE 802.11n standard, the combination of the MAC pad and the PHY pad in the prior art requires extra MAC padding scheme. Therefore, the present invention only utilizes the PHY pad similar to IEEE 802.11n standard, to reduce complexity for padding and decoding process. Then, the parsing mechanism in IEEE 802.11n standard is kept and reused in IEEE 802.11ac standard, to save time for developing related circuits, so as to increase the compatibility backward to IEEE 802.11n products.

Regarding hardware implement, e.g. a transmitter, the data extraction process 40 can be converted into a program stored in a memory for indicating a micro processor to execute the steps thereof. Converting the data extraction process 40 into an appropriate program to implement the corresponding data extraction apparatus should be well known for those skilled in the art.

Figure 6:
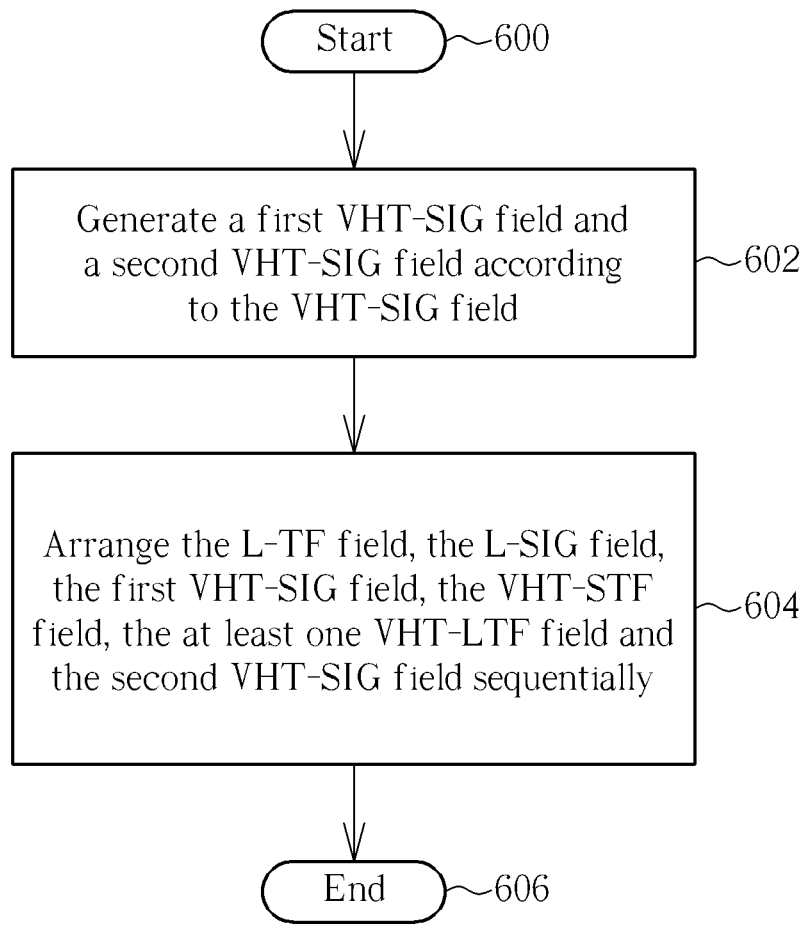
FIG. 6 is a schematic diagram of a process according to an embodiment of the present invention.

Please refer to FIG. 6. FIG. 6 is a flowchart of a process 60 according to an embodiment of the present invention. The process 60 is utilized for arranging packets in a wireless communication system conforming to a very high throughput (VHT) standard, e.g. IEEE 802.11ac standard. In the wireless communication system, each packet includes a preamble portion and a data portion. The preamble portion includes a legacy training field (L-TF), a legacy signal field (L-SIG), a very high throughput signal field (VHT-SIG), a very high throughput short training field (VHT-STF) and at least one very high throughput long training field (VHT-LTF). The process 60 is utilized for arranging a sequence of the preamble portion and includes steps of:

Step 600: Start.

Step 602: Generate a first VHT-SIG field and a second VHT-SIG field according to the VHT-SIG field.

Step 604: Arrange the L-TF field, the L-SIG field, the first VHT-SIG field, the VHT-STF field, the at least one VHT-LTF field and the second VHT-SIG field sequentially.

Step 606: End.

According to the process 60, two VHT-SIG fields, hereinafter named VHT-SIG A and B fields for simplicity, are generated according to the VHT-SIG field, e.g. by dividing the VHT-SIG field into the VHT-SIG A and B fields. And, the preamble portion is composed of the L-TF field, the L-SIG field, the VHT-SIG A field, the VHT-STF field, the at least one VHT-LTF field, and the VHT-SIG B field in a predetermined sequence, such as sequentially. More specifically, please refer to FIG. 7, which is a schematic diagram of a packet structure 70 according to the process 60. The packet structure 70 is utilized for is an exemplary embodiment for narrating the preamble portion arranged according to the process 60.

Figure 5:
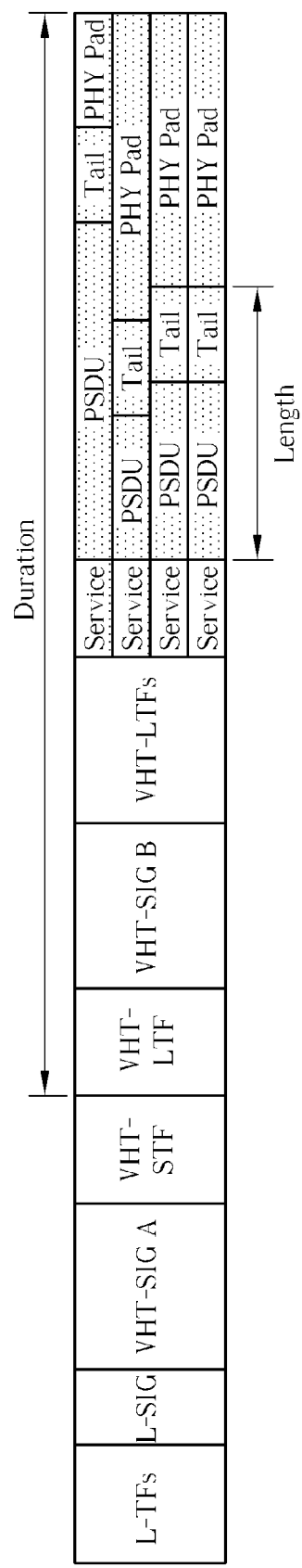
FIG. 5 is a schematic diagram of a preamble sequence according to the process in FIG. 4.
Figure 7:
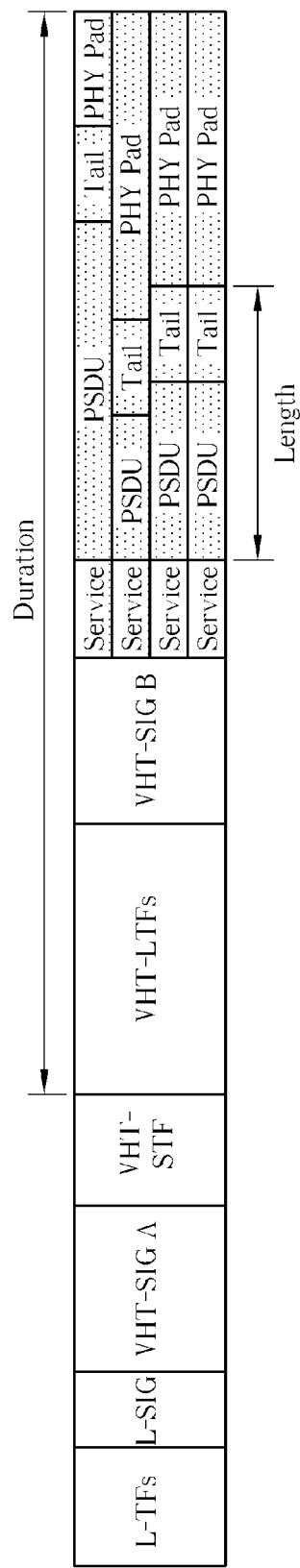
FIG. 7 is a schematic diagram of a preamble sequence according to the process in FIG. 6.

Comparing the packet structure 50 shown in FIG. 5 and the packet structure 70 shown in FIG. 7, it can be seen that the major difference between the packet structures 50 and 70 is that all of the VHT-LTF fields of the packet structure 70 are arranged in front of the VHT-SIG B field and are not separated. Both of the packet structures 50 and 70 have VHT-SIG A and B fields divided from the VHT-SIG field. Therefore, via the process 60, since the VHT-STF field and all of the VHT-LTF fields are arranged before the VHT-SIG B field and used for estimating frequency offset and time synchronization, the carried information of the VHT-SIG B field can be decoded more precisely, so as to assist decoding process of the data portion. The other detailed operations and advantages of the process 60 can be referred to the process 40, and are not narrated herein.

Regarding hardware implement, e.g. a transmitter, the data extraction process 60 can be converted into a program stored in a memory for indicating a micro processor to execute the steps thereof. Converting the data extraction process 60 into an appropriate program to implement the corresponding data extraction apparatus should be well known for those skilled in the art.

In conclusion, via the present invention, the IEEE 802.11ac packet can include different VHT-SIG fields, to carry different information, so as to increase efficiency for the decoder to process rest preamble portion and following data portion. In addition, the data portion is designed to be compatible with IEEE 802.11n standard, so as to save time for developing related circuits in IEEE 802.11ac standard.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of arranging a packet for a transmitter in a wireless communication system to assist with a data decoding process, the method comprising: generating, by a processor of the transmitter, a first very high throughput signal (VHT-SIG) field and a second VHT-SIG field; and arranging, by the processor, a legacy training field (L-TF), a legacy signal field (L-SIG), the first VHT-SIG field, a very high throughput short training field (VHT-STF), one of at least one very high throughput long training fields (VHT-LTF), the second VHT-SIG field and rest of the at least one VHT-LTF fields in a predetermined sequence as a preamble sequence of the packet; wherein the second VHT-SIG field comprises individual information corresponding to each of a plurality of users.

2. The method claim 1, wherein generating the first VHT-SIG field and the second VHT-SIG field according to the VHT-SIG field is achieved by dividing the VHT-SIG field into the first VHT-SIG field and the second VHT-SIG field.

3. The method claim 1, wherein the first VHT-SIG field comprises common information corresponding to the plurality of users.

4. The method claim 1, wherein the individual information comprises a length of a physical layer convergence procedure (PLCP) protocol data unit (PSDU) field for each user.

5. The method claim 1, wherein the data sequence comprises a service field, a physical layer convergence procedure (PLCP) service data unit (PSDU) field, a tail field and a pad field, and the method further comprises:
arranging the service field, the PSDU field, the tail field and the pad field sequentially.

6. A transmitter of a wireless communication system for performing the method of claim 1.

7. A method of arranging a packet for a transmitter in a wireless communication system to assist with a data decoding process, the method comprising: generating, by a processor of the transmitter, a first very high throughput signal (VHT-SIG) field and a second VHT-SIG field; and arranging, by the processor, a legacy training field (L-TF), a legacy signal field (L-SIG), the first VHT-SIG field, a very high throughput short training field (VHT-STF), at least one very high throughput long training fields (VHT-LTF) and the second VHT-SIG field in a predetermined sequence as a preamble sequence of the packet; wherein the second VHT-SIG field comprises individual information corresponding to each of a plurality of users.

8. The method claim 7, wherein generating the first VHT-SIG field and the second VHT-SIG field according to the VHT-SIG field is achieved by dividing the VHT-SIG field into the first VHT-SIG field and the second VHT-SIG field.

9. The method claim 7, wherein the first VHT-SIG field comprises common information corresponding to the plurality of users.

10. The method claim 7, wherein the individual information comprises a length of a physical layer convergence procedure (PLCP) protocol data unit (PSDU) field for each user.

11. The method claim 7, wherein the data sequence comprises a service field, a physical layer convergence procedure (PLCP) service data unit (PSDU) field, a tail field and a pad field, and the method further comprises:
arranging the service field, the PSDU field, the tail field and the pad field sequentially.

12. A transmitter of a wireless communication system for performing the method of claim 7.

* * * * *